Nov. 30, 1937.  J. K. DALE  2,100,433
PRODUCTION OF DEXTROSE
Filed Oct. 4, 1935
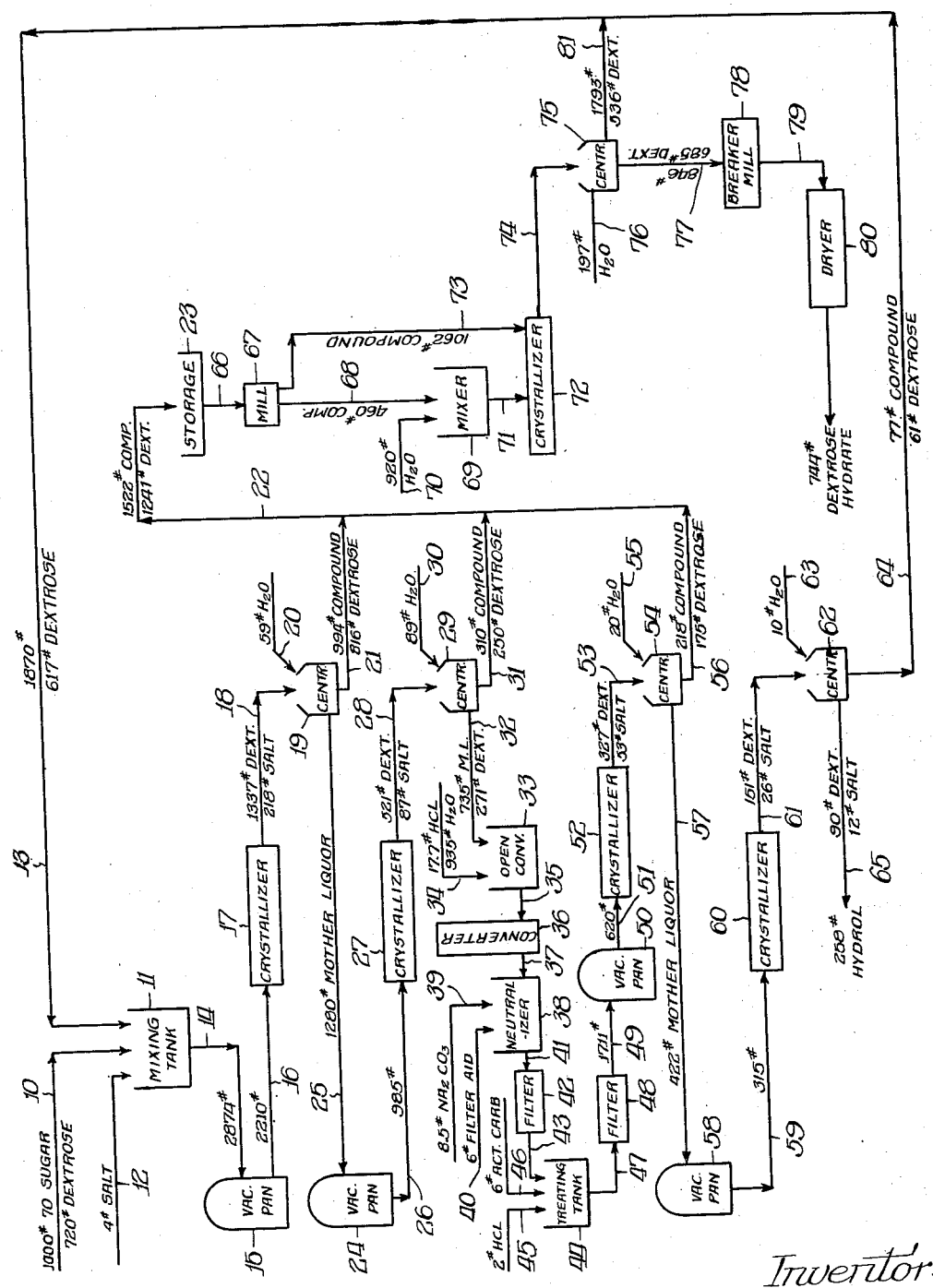
Inventor:
Julian K. Dale,
By Cromwell, Greist + Warden
attys.

Patented Nov. 30, 1937

2,100,433

UNITED STATES PATENT OFFICE 2,100,433

PRODUCTION OF DEXTROSE

Julian K. Dale, Decatur, Ill., assignor to A. E. Staley Manufacturing Company, Decatur, Ill., a corporation of Delaware Application October 4, 1935, Serial No. 43,562

9 Claims. (Cl. 127—40)

The present invention relates to the production of dextrose, and has particular reference to an improved method for the commercial recovery and purification of dextrose from solutions, such as starch solutions, which have been converted into sugar solutions by the well known acid hydrolysis, the invention contemplating the recovery of the dextrose by a process involving what appears to be a chemical reaction. In this connection, the present application constitutes a continuation in part of my copending application Serial No. 6,481, filed February 14, 1935, wherein is described a process involving combined physical and chemical dextrose recovery steps.

The most prominent method for recovering relatively pure dextrose from starch conversion liquors constitutes a concentration of the converted liquor to such an extent as to obtain a physical crystallization and separation of dextrose crystals, the time necessary for the crystallization ordinarily requiring from 4 to 8 days in the case of a solution of approximately 41° Bé. density. In this operation the temperature of the sugar solution ordinarily is controlled between 90 and 100° F. This prior method of recovery is described in Patents Nos. 1,471,347, 1,521,830, and 1,508,569.

Another process for recovering dextrose from various aqueous solutions which has been known for many years includes what appears to be a chemical reaction between dextrose and various inorganic compounds, such as sodium chloride, sodium bromide, and potassium chloride. That is, the dextrose solution is mixed with the desired amount of sodium chloride, for example, to produce a precipitate consisting of a dextrose-sodium chloride compound. By properly adjusting the concentrations, the sodium chloride may be extracted from the compound to leave crystals of dextrose. This process has been described generally by the investigator Matsuuva in the bulletin of the Chemical Society of Japan (2, 1927), pages 44 to 48, and in United States Patents Nos. 557,643 and 1,825,603.

A principal object of the present invention is the provision of a process involving this chemical type of recovery for the production of dextrose in a commercial manner.

An additional object is an improved method for the chemical recovery of dextrose from solutions containing the same, the recovered product being composed of relatively large and easily purged crystals.

A still further object is the provision of a plant process for the recovery of dextrose by the salt-dextrose reaction alone or in combination with physical recovery methods.

A still further object is to provide an improved extraction method for producing relatively large and well formed crystals of dextrose from compounds of the same with inorganic salts. These and other objects will be evident from a consideration of the following description and by reference to the accompanying drawing, in which Fig. 1 represents a flow sheet involving the production of dextrose in accordance with my invention as particularly applied to solutions of dextrose corresponding in purity, for example, with a solution of "70 sugar".

The salt-dextrose method for recovering dextrose depends upon the well known reaction by which sodium chloride combines with dextrose to form a compound $(C_6H_{12}O_6)_2.NaCl.H_2O$ which crystallizes readily to provide a relatively large yield, the time for the crystallization ordinarily being not more than from 24 to 72 hours, depending upon the purity of the sugar liquor.

As has been described in my copending application, the process may be used to great advantage in the recovery of dextrose from impure solutions, due to the comparative freeness with which the compound crystallizes even in the presence of impurities which appear to inhibit crystallization by the physical recovery process. The process in general comprises adding to a dextrose solution an amount of salt which will at least equal the molecular ratio shown in the foregoing formula, the solution being concentrated to a density of about 43.5° Bé. (at 100° F.) under such treatment. Crystallization of the double compound of dextrose and salt begins and progresses very rapidly. The precipitated crystals are separated from the liquid phase by centrifuging, a water wash being provided to remove uncrystallized impurities. To recover the dextrose from the resulting compound, a small quantity of water is added, the particular amount ordinarily being about 70 parts of water to 100 parts of the compound. This quantity is sufficiently large to insure a fluid magma and to hold the salt in solution. The dextrose crystallizes out, while the salt remains in solution.

In order to illustrate the present invention, the process will be described in some detail with respect to the accompanying flow sheet which represents an embodiment of the process which has been satisfactorily carried out.

In Fig. 1 a dextrose solution which may correspond to a solution of 70 sugar was passed through line 10 to a mixing tank 11 in quantities which comprise multiples of 1,000 pounds. The sugar solution contained 720 pounds of dextrose, and was analyzed as follows:

| | Percent |
|---|---|
| Moisture | 20 |
| Dextrose | 72 |
| Protein | 0.13 |
| Acidity (HCl) | 0.026 |
| Purity | 90 |

In the mixing tank a quantity of salt was added to adjust the ratio of salt to dextrose at 0.162, the required amount of salt being added through line 12. It will be noted that the legend on the flow sheet specifies the addition of only 4 pounds of salt, this small quantity being sufficient due to the return of certain process waters containing salt to the mixing tank. This returned salt-containing liquor is added to the mixing tank 11 through line 13 and consists of the mother liquor and washings from previous recovery steps and contains 617 pounds of dextrose plus an amount of salt which, added to the 4 pounds from line 12, provides the proper salt-dextrose ratio for formation of the salt-dextrose compound. The total material in the mixing tank is passed through line 14 to a vacuum pan 15 where the concentration of the liquid is increased to a density of substantially 43.5° Bé. Although some variation from this particular concentration is possible, it is preferred to maintain the concentration of the liquid at a density of between 43 and 44° Bé.

After the desired concentration has been reached, the liquor is pumped through line 16 to a first crystallizer 17. This crystallizer contains paddles or other mechanism for maintaining the liquor in motion during the crystallization period. Generally, the massecuite sticking to the sides of the crystallizer, is sufficient to provide seed for initiating crystallization of the new batch of salt-dextrose compound. In some cases where the temperature of the material entering the crystallizer is above a temperature which may be of the order of 130° F., it is desirable to add a few pounds of previously formed crystals as seed after the material has been cooled slowly to about 125° F. to 130° F. The crystallizer is cooled gradually to a temperature of 45 to 70° F. over a period of from 35 to 40 hours, the mixer being held at the final temperature from 5 to 8 hours. It is preferred to employ low temperatures as increased yields generally result from effecting the crystallization at the reduced temperature.

The initial crystallization step is followed by discharging the crystallized mixture through a distributing mixer through line 18 into a centrifugal separating device 19. It will be noted from the flow sheet that the mixture from the crystallizer 17 contains 1337 pounds of dextrose and 218 pounds of salt. In the centrifugal 19 the mother liquor is separated and 59 pounds of water are added through line 20 as wash water. The centrifugal is charged while in slow motion and rapidly accelerated to a top speed of 900 to 1,200 R. P. M. The screen on the centrifugal may have rounded openings of the order of .020 inch in diameter or smaller slotted openings. The crystals spin relatively dry in from 5 to 8 minutes and are washed with a spray of cold water for 1 to 2 minutes, a drying cycle of 2 to 4 minutes then following. The resulting salt-dextrose compound in the amount of 994 pounds and containing 816 pounds of dextrose is discharged through lines 21 and 22 to the storage compartment 23.

The mother liquor from the centrifugal 19, having a density of the order of 34° Bé., is passed to vacuum pan 24 through line 25. This mother liquor contains substantially 41% dextrose, while the salt-dextrose compound contains 57 to 61% of the original dextrose in tank 11.

In vacuum pan 24 the mother liquor is concentrated to a density of approximately 43.3° Bé. and thereafter is passed through line 26 to a second crystallizer 27. This crystallizer operates in substantially the same manner as described with respect to crystallizer 17. After crystallization is complete, the mixture containing 521 pounds of dextrose and 87 pounds of salt is passed through line 28 to a second centrifugal 29. Ordinarily, a period of approximately 30 minutes is required for the complete cycle of separation. It has been found that a slotted centrifugal screen or a woven wire cloth provides a satisfactory screen for the second centrifugal. As the mother liquor is more impure, a more extensive washing is required in centrifugal 29. 89 pounds of water may be sprayed into the centrifugal for this purpose through line 30. The centrifuging steps result in the production of 310 pounds of the salt-dextrose compound containing substantially 250 pounds of dextrose, and this compound is passed into line 22 and storage tank 23 through line 31. This amount of the compound represents a yield of 45 to 48% of dextrose.

The mother liquor is of a density of about 35° Bé. and contains approximately 37% glucose or dextrose, representing a purity of about 74.5%. This mother liquor passes through line 32 to an open conversion tank 33 into which is added through line 34 acidulated water containing 935 pounds of water and 17.7 pounds of hydrochloric acid. The mother liquor is diluted to a density of 14 to 14.5° Bé. at 60° F. and the hydrochloric acid brings the mixture to a pH of substantially 1.5. The acidulated and diluted liquor is heated with a steam coil or jet in the open converter to 180 to 190° F., and the heated liquor is passed through line 35 to a closed pressure converter 36 where it is held under 30 to 35 pounds of steam pressure for approximately 30 minutes. The time for conversion may be cut down by employing a higher steam pressure, but generally a darker liquor is the result of this procedure. Lower pressures than 30 pounds require longer conversion time but do not result in a much lighter liquor. The liquor enters the converter at about 75% purity and leaves at a purity of 88 to 90%, thereby indicating a net increase of 20% in the amount of dextrose.

From the converter 36 the liquor passes through line 37 to a neutralizer 38 wherein a sufficient quantity of soda ash or sodium carbonate is added through line 39 to provide a pH of substantially 7.0 in the liquor. As shown on the flow sheet, 8.5 pounds of sodium carbonate are added. It is additionally desirable to add to the liquor a filter aid, which may be supplied through line 40. The neutralized liquor is passed through line 41 to the filter 42 to remove coagulated material. After passing through the filter 42 it is desirable to treat the material with activated vegetable decolorizing carbon, such as the product known as "Darco". The filtrate then passes through line 43 to a treating tank 44 where the pH is adjusted to between 4.4 and 4.6 by the addition of approximately 2 pounds of HCl through line 45 and the temperature is maintained at around 160° F. An amount of activated carbon equivalent to 2% by weight of the dextrose in the liquor is added through line 46 and the mixture is agitated for 10 to 20 minutes before being passed through line 47 to a suitable filter press 48. Before being removed from the liquor by the filter press, the carbon serves to remove not only color but also materials which later tend to create a black insoluble precipitate.

The liquor subsequently is pumped through line 49 to vacuum pan 50 where the liquor is evaporated under vacuum to a density of about 43.1° Bé. Thereafter the concentrated liquor is passed through line 51 to a third crystallizer 52, which is operated in the same manner as specified with respect to crystallizer 17. After crystallization is complete the material is passed through line 53 into a third centrifugal 54, where the crystals are separated from the mother liquor and are washed with 20 pounds of water entering the centrifugal through line 55. Of the 327 pounds of dextrose entering the centrifugal, the 218 pounds of dextrose-salt compound containing 175 pounds of dextrose are recovered and passed through lines 56 and 22 to the storage tank 23.

The mother liquor from the centrifugal has a concentration of substantially 34° Bé. and analyzes about 40% dextrose. This mother liquor is passed through line 57 into a fourth vacuum pan 58 and its concentration is increased to a density of about 43° Bé. The concentrated liquor is passed through line 59 into a fourth crystallizer 60 wherein the material is treated in substantially the same manner as described with respect to crystallizer 17 except that crystallization continues for a longer period of time. In many cases it will be found desirable to effect crystallization in this fourth crystallizer for a period of time of the order of 72 hours. The crystallized material is dropped through line 61 into a fourth centrifugal 62 in which the salt-dextrose compound is separated from the mother liquor, washed with 10 pounds of water from line 63 and dried in substantially the same manner as described heretofore. Of the 151 pounds of dextrose and 26 pounds of salt entering the centrifugal 62, 77 pounds of the salt-dextrose compound containing about 61 pounds of dextrose are recovered and the compound is passed through line 64 back to the mixing tank 11 through line 13.

The mother liquor from the centrifugal 62 passes through line 65 to a suitable source of disposal. This mother liquor is of a density of about 35° Bé. and shows an analysis of 90 pounds of dextrose and 12 pounds of salt.

The salt-dextrose compound passing from centrifugals 19, 29 and 54 are stored in bin 23 without drying. This material will analyze about 81.5% dextrose and 13.2% salt, the remainder being water, of which the greatest percentage is water of crystallization.

The compound is fed from storage bin 23 through line 66 into a mill 67 where it is thrashed or pulverized to break up agglomerates of crystals. The extraction step, whereby dextrose is recovered from the compound, may be carried out in a batch process or in a continuous process. In either case, the salt-dextrose compound and the water are brought together in such a manner that there is a gradual increase in the amount of the compound in the water, the total amount of water being relatively small. In this manner, a considerable portion of the dextrose may have precipitated from the water before the total amount of the salt-dextrose compound has been added thereto. This gradual addition of the compound to the water results in maintaining a small and substantially constant degree of supersaturation and the formation of relatively large, easily purged crystals which may be several times the dimensions of crystals produced otherwise.

Where the extraction method is carried out in a batch process, three parts by weight of the salt-dextrose compound are added to six parts of water, the compound going into solution in the water. Then, seven parts of the compound are added slowly to the crystallizer over a period of the order of 20 minutes. The crystallizer then is run for about 10 minutes longer before the massecuite is dropped into a centrifugal. The temperature during the crystallization period preferably is about 40° F. While warmer water results in a production of crystals of even larger size under the methods of procedure outlined, this larger size crystal is accompanied by an increased solution of the dextrose and a decreased total yield.

As shown in the flow sheet, the extraction is perfected in a substantially continuous manner. Substantially one part of the salt-dextrose compound is passed through line 68 to a mixer 69 where it is added to substantially two parts of water passing into the mixer through line 70. The resulting solution flows continuously through line 71 to a relatively long continuous crystallizer 72 which is provided with a suitable spiraled ribbon conveyor adapted to keep the crystals in motion. The length of the crystallizer and the rate of travel therethrough is adjusted so that the material passes the entire length of the crystallizer for a period of time of the order of 30 minutes. As the water and compound pass through the crystallizer additional quantities of the compound are slowly added at several stations in the line of flow through the crystallizer, an adjustable conveyor indicated diagrammatically by line 73 being employed for this purpose. It is preferred that the ratio of water to the total quantity of the compound be about 0.6, as this ratio provides satisfactory crystal growth and a fairly heavy massecuite. The exact ratio will depend upon such factors as local handling equipment.

In order to produce large crystals of high purity the temperature of the extraction water is maintained between 40° F. and 60° F. The crystallizer is agitated at a rate of between 4 and 8 R. P. M. The compound is added gradually so that at all times during the crystallization the solution is only slightly supersaturated. After the crystallization is complete the mixture of dextrose crystals and mother liquor is subjected to a centrifuging process, and the crystallization continues no longer than one hour before the centrifuging. By proceeding in the manner described, satisfactory physical operation of the process is obtained with a water to compound ratio of about 0.6. By obtaining large crystals, the dextrose centrifuges freely and may be washed free from salt with ease. Additionally, the centrifuge is operable to dry the crystals more thoroughly than in the case of small crystals, thereby reducing drying costs. The crystals are less dusty and more free flowing and acceptable to the trade which is accustomed to cane and beet sugar.

After passing through the crystallizer 72 the crystallized mixture drops through line 74 into the centrifugal device 75. 197 pounds of water are added through line 76 for washing purposes, and as a result of the centrifuging, 685 pounds of dextrose are recovered. This dextrose passes through line 77 to a mill 78 where it is broken up. Thereafter, the dextrose crystals pass through line 79 to drier 80, the moisture content of the sugar being reduced to the desired extent.

The liquid passing through the centrifugal 75 in an amount of 2090 pounds containing 556 pounds of dextrose is directed through line 81 into line 64 which transfers the liquid back to mixing tank 11.

The crystallizer 75 may have a perforated screen provided with 0.02 inch perforations. The centrifuging cycle may consist of one minute loading, 6 minutes centrifuging, 6 to 8 minutes washing, 5 minutes drying and 3 minutes discharging. The wash water is best added in a finely divided spray, and the washing is continued until the salt content of the sugar is reduced to the desired extent. A 6-minute wash with 27 pounds of water per 100 pounds of wet dextrose hydrate is sufficient to lower the salt content below 0.4%. The yield of dextrose under such circumstances may be of the order of 55 to 65% or more of that contained in the material going to the centrifugal.

The extraction liquors passing through line 81 are of approximately 24° Bé. density at 60° F. and contain about 27 to 30% dextrose and 10 to 12% salt. The wet dextrose hydrate from the crystallizer contains approximately 13% free moisture, 80% dextrose, a small quantity of sodium chloride and the remainder water of crystallization. The mill 78 acts as a breaker and following this mill the material passes through line 79 to an indirect, hot air, rotary drier 80 having a screen on the discharge end for removing material over 30 mesh. In the drier 80 air enters at a temperature of 220° to 250° F. and the finished product contains substantially 92% dextrose and 8% of water of crystallization. In accordance with the operation of this process the yield of dextrose hydrate will be substantially 93% of the dextrose contained in the original sugar solution which was added to the mixing tank 11. The process by which this high yield is obtained is rapid in operation and economical, and the product which results from the process is a high grade material of particularly desirable crystalline structure.

It will be noted that the salt-dextrose produced from the final crystallization of the original liquor and the mother liquor from the extraction process is combined and mixed with additional sugar solution in the mixing tank 11. In this manner, the amount of salt necessary to add to the mixing tank 11 is quite small, since the salt in the solution coming through line 13 is sufficient to combine with substantially the entire amount of the newly added sugar. Salt is created in the process by way of the neutralizer 38 and the amount of loss of salt through the final product is quite small. By subjecting the original mother liquor to an additional salt-dextrose recovery step, a subsequent re-hydrolysis of the mother liquor in the presence of the salt, subjecting the re-hydrolyzed mother liquor to further crystallization, extracting the salt-dextrose product produced by these steps to provide a final pure dextrose, subjecting the last mother liquor to a still further crystallization process, and returning the salt-dextrose compound resulting therefrom, together with the salt-dextrose compound from the extraction process to an initial stage of the complete process, a highly effective operation is produced. The total amount of dextrose in the process is considerably more than the 720 pounds of dextrose added to mixing tank 11, but the amount of dextrose recovered during operation of the process is substantially 93% of the initial 720 pounds.

The reactions involved in the process are somewhat complicated, and the following theory of its operation must be taken only as an effort toward further explanation. Apparently the dextrose passes through various forms in which its solubility differs to an extent sufficient for recovery apart from the impurities with which it originally is contaminated. Dextrose in solution consists of an equilibrium mixture of the alpha and beta forms, the latter being considerably more soluble than the former. In ordinary crystallization from aqueous solution, dextrose is crystallized only in the less soluble alpha form. When salt is reacted with an aqueous solution of dextrose and the resulting compound is precipitated, the dextrose of the compound exists in the less soluble alpha form. This compound itself is more soluble in cold water than is the alpha dextrose and less soluble than the equilibrium mixture of alpha and beta dextrose. Extraction of the salt-dextrose compound with a small quantity of water causes precipitation of the dextrose in the less soluble alpha form. Summarizing, the original equilibrium solution of alpha and beta dextrose is more soluble than the alpha dextrose-salt compound which is precipitated therefrom, and the final product consisting of crystalline alpha dextrose is less soluble than the salt-dextrose compound from which it is extracted. Hence, it would appear that in the operation of the process the dextrose is converted into successively less soluble forms.

The original equilibrium solution contains alpha and beta dextrose in the approximate ratio of 35% alpha to 65% beta. Precipitation of alpha dextrose-salt compound therefrom results in mutarotation of the beta form into alpha to restore the equilibrium, and further crystallization of the compound may be carried out to exhaustion of the dextrose from the solution. When this compound is mixed with a small quantity of cold water, solution takes place quite rapidly to produce a condition of supersaturation with respect to the alpha dextrose, and the latter precipitates before it has an opportunity to be changed by mutarotation into the more soluble equilibrium form. Crystallization of the alpha dextrose may take place so rapidly that the quickly formed, thin solution of dextrose-salt compound may set up to a thick magma in 2 or 3 minutes. The immediate addition of all of the compound to the extraction water hastens the formation of these crystals by the production of a high degree of supersaturation and consequently cuts down the apparent loss of yield due to mutarotation of the alpha dextrose to the more soluble beta form. However, I have found that by retarded addition of the compound to the extraction water, the resulting low degree of supersaturation is accompanied by the formation of large crystals. Also, by proceeding in accordance with the process described herein, the well formed crystals are produced and at the same time highly satisfactory yields are obtained.

In the retarded extraction process described herein, the amount of salt-dextrose compound in the extraction step is controlled so as to create and maintain a relatively small degree of supersaturation. This small degree of supersaturation may be produced by adding an initial amount of the compound and subsequently adding additional quantities thereof. The additional compound may be added in increments or continuously over a period of time, and the dextrose which precipitates as the result of this procedure comprises large crystals of well formed, uniform structure in general well developed along three dimensions.

Precipitation of the dextrose by this step-wise method permits the use of less water per unit of the compound extracted than in the processes in which the entire compound immediately is added to the water. Even with the lesser amounts of water possible with the step-wise method of extraction, the resulting massecuite is thinner, more mobile and centrifuges more readily. Avoidance of a high initial supersaturation results in slower crystallization of the dextrose hydrate. Preferably the initial amount of the compound which is added to the extraction water is such that the water will be approximately saturated with respect to alpha dextrose. It will be understood that a slight supersaturation or under saturation at this stage will not prevent good results from being obtained. If the solution is slightly supersaturated initially, crystallization will begin before the second stage of the extraction process is commenced. The consequent addition of further quantities of the compound is accompanied by general agitation and may cover a period of time of the order of 15 to 20 minutes.

As each successive increment of the compound is added it rapidly goes into solution, re-establishing a mild degree of alpha dextrose saturation. By this process the degree of supersaturation is never very high, and the crystallization takes place slowly and continuously to produce a granular massecuite of large, well formed, unitary crystals.

In the ordinary extraction of dextrose from its salt compound a ratio of at least substantially seven parts of water to ten parts of the compound is necessary to yield a sugar which is free from salt. In accordance with the process described herein the low viscosity and greater mobility of the massecuite permits a lower ratio of water to the compound to be employed, and at the same time the massecuite may be purged rapidly and readily washed free from salt. This is an important factor from a manufacturing standpoint, since larger yields of sugar may be obtained from the compound and at the same time a smaller amount of material is returned to the first stage of the process by recirculation.

The improved physical condition of the sugar produced in accordance with my process may be seen from the nature of the centrifugal cake. The moist cake is grainy, breaks up readily and the crystals do not have a tendency to stick together when a portion is pressed between the fingers.

Where a one-stage extracted process is employed, the centrifugal cake is soft and doughy and the crystals have a tendency to stick together in cakes when pressed between the fingers. My improved sugar is granular and so readily sieved that it may be passed through a 40 mesh sieve without grinding. Also, the sugar leaves the drier in a uniform, granular condition, whereas sugar extracted by a one-stage process largely consists of a mixture of small pellets and powdery material having a chalky feel.

It will be recognized that the invention has been described by way of illustration and explanation and such changes as may be made without departing from the scope of the invention are intended to be included in the appended claims. For example, it is desirable to produce dextrose by subjecting an impure dextrose solution to one or more physical crystallization steps in accordance with well known methods such as those described in the patents mentioned hereinbefore and to subsequently treat the hydrol or mother liquor resulting from such physical crystallization in accordance with the process described herein. As a result, higher yields are obtained than may be obtained economically by the direct crystallization process and at the same time the resulting dextrose is of a highly desirable physical structure, these factors being accompanied by a low cost of production.

I claim:

1. In the process of recovering dextrose from impure solutions of the same, the steps which include combining the dextrose in impure aqueous solution with salt, crystallizing the salt-dextrose compound and subjecting the crystalline salt-dextrose compound to an aqueous extraction procedure in which the compound is added to a relatively small quantity of water in portions over a period of time sufficient to permit crystallization of dextrose from the extraction liquid before all of the compound is added to the extraction water.

2. The process for recovering dextrose from impure solutions of the same, which comprises combining the dextrose with salt in an impure aqueous solution, crystallizing out the resulting salt-dextrose compound, and subjecting the crystalline salt-dextrose compound to an extraction process wherein the compound is added to the extraction water at a rate sufficiently slow to produce only a small degree of supersaturation in the extraction liquid.

3. The process of producing dextrose, which comprises mixing the dextrose with salt in an impure aqueous medium, concentrating the aqueous medium to a gravity of the order of 43 to 44° Bé., subjecting the resulting aqueous solution of salt-dextrose compound to crystallization, centrifuging the salt-dextrose compound to free the same from its mother liquor, subjecting the salt-dextrose compound to water extraction to produce dextrose and a mother liquor, separating the dextrose from said mother liquor by centrifuging, and subjecting the mother liquor from the first of said centrifugal steps and the mother liquor from the last of said centrifugal steps to recrystallization as salt-dextrose compound.

4. The process of recovering dextrose from an impure solution, which comprises mixing the impure dextrose solution with salt, subjecting the resulting aqueous solution of salt-dextrose compound in relatively concentrated form to crystallization, centrifuging the salt-dextrose compound to free the same from its mother liquor, and subjecting the crystalline salt-dextrose compound to an aqueous extraction procedure wherein the compound is added to the extraction water at a rate sufficiently slow to produce only a small degree of supersaturation in the extraction liquid, the final ratio of extraction water to the salt-dextrose compound being below 0.7.

5. The process of recovering dextrose from an impure solution, which comprises mixing the impure dextrose solution with salt in an aqueous medium, concentrating the aqueous medium to a density of the order of 43 to 44° Bé., subjecting the resulting aqueous solution of salt-dextrose compound to crystallization at a temperature of between 45 and 70° F. over a period of from 35 to 40 hours, centrifuging the crystalline salt-dextrose compound to free the same from its mother liquor, subjecting the mother liquor to an additional concentration and crystallization, centrifuging the crystallized mother liquor to produce a second quantity of salt-dextrose compound and a second mother liquor, subjecting said second mother liquor to conversion, concentration and crystallization, centrifuging the crystallized second mother liquor to produce a third quantity of salt-dextrose compound and a third mother liquor, subjecting said third mother liquor to concentration and crystallization, centrifuging the crystallized third mother liquor to produce a fourth quantity of salt-dextrose compound, mixing said fourth quantity of compound with additional dextrose and salt for re-processing, subjecting the other of said quantities of said salt-dextrose compound to a water extraction in which the compound is added to the extraction water at a rate sufficiently slow to produce only a small degree of supersaturation in the extraction liquid, centrifuging the resulting crystallized dextrose, and including the liquor from said last named centrifuging with the fourth quantity of salt-dextrose compound.

6. The process of recovering dextrose from an impure aqueous solution, which comprises combining dextrose with salt in said impure aqueous solution, crystallizing out the resulting salt-dextrose compound, separating said salt-dextrose compound from its mother liquor, subjecting the mother liquor to conversion with hydrochloric acid, neutralizing said acid with an alkaline reacting sodium compound to produce additional quantities of salt, recovering salt-dextrose compound from the converted mother liquor, subjecting the first mentioned quantity of salt-dextrose compound to an aqueous extraction to produce crystalline dextrose, and returning the liquor from said crystalline dextrose with at least a portion of the quantity of said compound recovered from the converted mother liquor for recrystallization in said first named step of crystallizing the salt-dextrose compound.

7. The process of recovering dextrose from an impure aqueous solution, which comprises subjecting an impure aqueous solution of salt-dextrose compound to repeated crystallization and centrifuging steps to produce crystalline salt-dextrose compound and mother liquors, subjecting the resulting crystalline salt-dextrose compound to an aqueous extraction to produce crystalline dextrose, subjecting the mother liquor from the last salt-dextrose centrifuging to acid conversion, crystallizing and centrifuging the converted mother liquor to produce a further quantity of salt-dextrose compound, and returning said further quantity of compound for recrystallization together with previously formed salt-dextrose compound.

8. The process of recovering dextrose from an impure solution thereof, which comprises combining said dextrose solution with salt in an aqueous medium, subjecting the resulting aqueous solution of salt-dextrose compound in relatively concentrated form to crystallization, centrifuging the salt-dextrose compound to free the same from its mother liquor, subjecting the salt-dextrose compound to water extraction to produce dextrose and a second mother liquor, separating an impure fraction from said first named mother liquor, and mixing said second mother liquor with an additional quantity of dextrose for repeating said process.

9. The process of recovering dextrose from crystalline salt-dextrose compound, which comprises subjecting the crystalline salt-dextrose compound to an extraction process wherein the crystalline compound is added to water at a rate which is sufficiently slow to produce only a small degree of supersaturation in the water, and separating the resulting precipitated dextrose from the water before the precipitated dextrose dissolves in said water.

JULIAN K. DALE.